(12) United States Patent
Mellteg et al.

(10) Patent No.: US 9,954,428 B2
(45) Date of Patent: Apr. 24, 2018

(54) DETERMINATION OF PHASE OFFSETS IN A SUPPLY SYSTEM HAVING MULTIPLE SWITCHING CONVERTERS

(71) Applicant: Telefonaktiebolaget LM Ericsson (publ), Stockholm (SE)

(72) Inventors: Maguns Mellteg, Kalmar (SE); Andreas Larsson, Kalmar (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 96 days.

(21) Appl. No.: 15/115,371

(22) PCT Filed: Jan. 30, 2014

(86) PCT No.: PCT/EP2014/051783
§ 371 (c)(1),
(2) Date: Jul. 29, 2016

(87) PCT Pub. No.: WO2015/113599
PCT Pub. Date: Aug. 6, 2015

(65) Prior Publication Data
US 2017/0005567 A1 Jan. 5, 2017

(51) Int. Cl.
*H02M 1/15* (2006.01)
*H02M 3/157* (2006.01)
(Continued)

(52) U.S. Cl.
CPC ............ *H02M 1/15* (2013.01); *H02M 3/157* (2013.01); *H02M 3/1584* (2013.01); *H02M 2001/008* (2013.01)

(58) Field of Classification Search
CPC ............ H02M 1/15; H02M 2001/008; H02M 2003/1586; H02M 1/14; H02M 3/156;
(Continued)

(56) References Cited

U.S. PATENT DOCUMENTS

| 8,237,423 B2 | 8/2012 | Heineman et al. |
| 8,237,432 B2 | 8/2012 | Heinman et al. |

(Continued)

FOREIGN PATENT DOCUMENTS

| DE | 202009009856 U1 | 12/2009 |
| EP | 2515421 A1 | 10/2012 |
| WO | 2015113599 A1 | 8/2015 |

OTHER PUBLICATIONS

PCT/EP2014/051783 Written Opinion and Search Report dated Dec. 2, 2014, 11 pages.
(Continued)

*Primary Examiner* — Zahid Choudhury
(74) *Attorney, Agent, or Firm* — Boisbrun Hofman, PLLC

(57) ABSTRACT

A controller, and related method, to control switching elements of a plurality of voltage converters of a power system. The controller receives a signal representing an operating condition that indicates a contribution of each of the plurality of voltage converters to a ripple component of an input current or an input voltage of the power system. The controller ranks the plurality of voltage converters based on the contribution of each of the plurality of voltage converters to the ripple component. The controller calculates a switching phase offset for each switching element of the plurality of voltage converters by determining a switching order for each switching element of the plurality of voltage converters based on an alternating extremum contribution to the ripple component, and arranging control signals for each switching element of the plurality of voltage converters based on the switching order.

20 Claims, 7 Drawing Sheets

(51) Int. Cl.
*H02M 3/158* (2006.01)
*H02M 1/00* (2006.01)

(58) Field of Classification Search
CPC ................. H02M 3/157; H02M 1/584; H02M 2001/007; G01R 29/18
See application file for complete search history.

(56) References Cited

U.S. PATENT DOCUMENTS

| | | | | |
|---|---|---|---|---|
| 2005/0052163 A1* | 3/2005 | Sutardja | ................ | H02M 3/157 323/222 |
| 2008/0018313 A1* | 1/2008 | Cagno | .................... | H02M 1/15 323/282 |
| 2009/0189443 A1* | 7/2009 | Lin | ........................ | H02M 1/08 307/12 |
| 2010/0096923 A1* | 4/2010 | Marsili | .................. | H02M 3/00 307/31 |
| 2010/0321080 A1* | 12/2010 | Chen | .................. | H02M 3/1584 327/295 |
| 2012/0230070 A1* | 9/2012 | Chen | ....................... | H02M 1/15 363/56.02 |

OTHER PUBLICATIONS

Hegarty, T., "Reducing buck converter input capacitance through multi-phasing and clock synchronization", Jan. 28, 2008, EDN Network, 17 pages.

PCT/EP2014/051783, International Search Report and Written Opinion, dated Dec. 2, 2014, 11 pages.

* cited by examiner

DETERMINATION OF PHASE OFFSETS IN A SUPPLY SYSTEM HAVING MULTIPLE SWITCHING CONVERTERS

CROSS-REFERENCE TO RELATED APPLICATIONS

This application is the National Stage of, and therefore claims the benefit of, International Application No. PCT/EP2014/051783 filed on Jan. 30, 2014, Published as International Publication No. WO 2015/113599 A1, entitled "Determination of Phase Offets in a Power Supply System having Multiple Switching Converters". The above application is commonly assigned with this National Stage application and is incorporated herein by reference in its entirety.

TECHNICAL FIELD

The disclosure herein generally relates to the field of power supply systems having a plurality of voltage converters, each configured to convert an input voltage to an output voltage by switching a switching element at a predetermined frequency, and more specifically to the determination of a distribution of switching phases among the voltage converters in such power supply systems.

BACKGROUND

In recent years, the development of power supply systems having multiple switching voltage converters has led to improvements in the performance and efficiency of many kinds of electronic equipment.

For example, the demand for ever faster and more complex signal and data processing in diverse fields of application has fuelled the need for new generations of signal processing systems having multiple high-performance integrated circuits (e.g. processors, ASICs and FPGAs), which are characterised by their need for multiple low supply voltages, high levels of current demand and tight supply voltage regulation requirements. These needs are met by multi-converter power supply systems such as the so-called Intermediate Bus Architecture (IBA) power supply, which provides a number of tightly-regulated voltages from an input power source via a two-stage voltage conversion arrangement.

FIG. 1 is a schematic showing an example of a conventional IBA power supply. In the example of FIG. 1, the IBA power system 10 is a two-stage power distribution network comprising a first stage DC/DC converter 20 connected to an input power bus 30, which is typically at a voltage $V_{DCH}$ of 36-75 V, 18-36 V or 18-60 V. The IBC 20 is typically implemented in the efficient form of a switched mode power supply (SMPS), which may be fully regulated or line regulated to convert the input power bus voltage $V_{DCH}$ to a lower intermediate bus voltage $V_{IB}$ on the Intermediate Voltage Bus (IVB) 40. The first stage DC/DC converter 20 is connected via the IVB 40 to the inputs of a number (N) of second stage DC/DC voltage converters 50-1 to 50-N.

In the example of FIG. 1, each of the plurality of second stage DC/DC voltage converters 50-1 to 50-N is a non-isolated buck regulator commonly referred to as a Point-of-Load (POL) regulator. In general, each of the POL regulators may be isolated or non-isolated. However, where isolation is provided by the IBC 20, the POL regulators are preferably all non-isolated. Each POL regulator (k) is an SMPS and delivers a regulated voltage $Vout_k$ to its load 60-k by switching a switching element (such as a power MOSFET) in the POL with a switching duty cycle that determines the voltage conversion ratio. In the example of FIG. 1, POL regulators 50-1 and 50-2 deliver power to a common load 60-1 (although more than two POL regulators may deliver power to a common load).

Although the IBC 20 and the POL regulators 50-1 to 50-N are buck regulators in the example of FIG. 1, their topology is not limited to such and may alternatively be Boost, Buck-Boost etc.

In such a power supply system having a plurality of voltage converters 50-1 to 50-N, the switching phases of the converters 50-1 to 50-N may need to be offset relative to one another in order to reduce certain undesirable effects in the system. These undesirable effects include a large ripple current in the IVB 40 and high levels of radiated emissions due to synchronized edges of the switching pulses. It should be noted that these problems are not particular to IBA power supplies and arise in many other applications that make use of multiple switching voltage converters, such as current sharing rails and tracking/sequencing groups.

So-called "phase spreading" is one approach to mitigating these effects. The simplest way of phase spreading is to allow the voltage converters (in the example of FIG. 1, the POL regulators 50-1 to 50-N) to operate individually, from their own internally generated clock. This randomizes the occurrence of switching pulse edges in time, thereby reducing the likelihood of switching pulses coinciding such that a high peak current is momentarily drawn from the input source that feeds the voltage converters (i.e. the IBC 20 in the example of FIG. 1).

A more controlled and effective way of phase spreading involves controlling the switching of the voltage converters on the basis of a common clock signal, and distributing respective switching pulse edges of the voltage converters through the switching period. In this case, a single clock source is used for all of the converters and each converter has its switching phase offset set to a different value within a period of the switching cycle, $T_s$. For example in a group of three voltage converters operating with a common duty cycle, phase offsets of $T_s/3$ may be introduced between the converters. This type of phase spreading effectively reduces the input ripple current and also reduces the magnitude, and increases the frequency, of radiated emissions.

As the number of voltage converters in such power supply systems increases and the demand for higher currents becomes more common, there is an increasing need for an optimised controlled phase spreading that results in lowest possible input ripple current. This is not merely a task of distributing the phase offsets equally throughout a period of the switching cycle because, as will be explained in the following, the contribution from each converter to the input ripple current depends on the duty cycle with which the converter operates and its load current.

Heretofore, it has been usual to manually select the phase offset for each voltage converter when configuring the power supply system prior to use. However, as the number of converters in the power supply system increases, the number of possible combinations of phase offset values increases dramatically. This makes it very difficult to manually find the phase offsets giving the lowest input ripple current. Furthermore, known approaches to setting the phase offsets have been much too slow to allow for phase offsets to be optimised "on the fly", in response to changes in the voltage converters' loads during operation of the power supply system, and thereby maintain a low input current ripple.

SUMMARY

In view of the problems with conventional approaches to distributing the switching phases among the voltage converters in power supply systems as described above, the present inventors have devised a computationally efficient scheme for determining a near-optimal distribution of switching phase offsets among the switching elements in the system, which allows the input current and voltage ripple, and any input capacitance that may be provided in the power supply system, to be effectively reduced.

More specifically, an embodiment of the invention described herein provides a controller for determining a distribution of switching phases among switching elements of a power supply system, the power supply system comprising a plurality, N, of voltage converters, wherein each voltage converter comprises a respective one of the switching elements and is arranged to convert an input voltage supplied to the voltage converters to a respective output voltage by applying a control pulse to the respective switching element at a predetermined switching frequency, f, so as to switch the switching element ON for the duration of the control pulse during a switching period 1/f. During operation of the power supply system, the sum of the pulse durations of the control pulses used by the plurality of voltage converters in the switching period is smaller than the switching period. The controller comprises a receiver for receiving one or more signals indicative of a respective contribution from each of the voltage converters to a ripple current component of an input current of the voltage converters. The controller further comprises a switching phase offset calculator configured to calculate, based on the received one or more signals, a respective switching phase offset that is to be applied for the switching element in each of the voltage converters by: (i) determining a switching order in which the switching elements of the respective voltage converters are to be switched ON during a switching period, by assigning to each $j^{th}$ position in the switching order, where $j=1, 2, \ldots N$, a respective one of the voltage converters using the expression $$f(j) = \left(\frac{j+1}{2}\right)\left(\frac{1+(-1)^{j+1}}{2}\right) + \left(N - \frac{j-2}{2}\right)\left(\frac{1+(-1)^j}{2}\right),$$

where $f(j)$ represents the position, in a ranking of the voltage converters in order of decreasing contribution to the ripple current component, of the voltage converter for position j in the switching order; and (ii) arranging the control pulses of the voltage converters within the switching period in accordance with the determined switching order such that the period of time between each adjacent pair of control pulses in the switching period is the same. The controller also includes an output signal generator which is configured to generate one or more output signals defining the calculated switching phase offsets to be applied to the switching of the respective switching elements.

By determining the switching order in this way, and by arranging the control pulses of the voltage converters within the switching period according to the determined switching order, the switching phase offset calculator of the controller is able to calculate an optimised phase spread for the voltage converters in a highly efficient way.

In another embodiment, there is provided a controller for determining a distribution of switching phases among switching elements of a power supply system, the power supply system comprising a plurality, N, of voltage converters, wherein each voltage converter comprises a respective one of the switching elements and is arranged to convert an input voltage supplied to the voltage converters to a respective output voltage by applying a control pulse to the respective switching element at a predetermined switching frequency, f, so as to switch the switching element ON for the duration of the control pulse during a switching period 1/f. During operation of the power supply system, the sum of the pulse durations of the control pulses used by the plurality of voltage converters in the switching period is smaller than the switching period. The controller comprises a receiver for receiving one or more signals indicative of a respective contribution from each of the voltage converters to a ripple voltage component of an input voltage input to the voltage converters. The controller further comprises a switching phase offset calculator configured to calculate, based on the received one or more signals, a respective switching phase offset that is to be applied for the switching element in each of the voltage converters by: (i) determining a switching order in which the switching elements of the respective voltage converters are to be switched ON during a switching period, by assigning to each $j^{th}$ position in the switching order, where $j=1, 2, \ldots N$, a respective one of the voltage converters using the expression $$f(j) = \left(\frac{j+1}{2}\right)\left(\frac{1+(-1)^{j+1}}{2}\right) + \left(N - \frac{j-2}{2}\right)\left(\frac{1+(-1)^j}{2}\right),$$

where $f(j)$ represents the position, in a ranking of the voltage converters in order of decreasing contribution to the ripple voltage component, of the voltage converter for position j in the switching order; and (ii) arranging the control pulses of the voltage converters within the switching period in accordance with the determined switching order such that the period of time between each adjacent pair of control pulses in the switching period is the same. The controller also includes an output signal generator which is configured to generate one or more output signals defining the calculated switching phase offsets to be applied to the switching of the respective switching elements.

In another embodiment, there is provided a power supply system, comprising a plurality of voltage converters, wherein each voltage converter comprises a respective switching element and is arranged to convert an input voltage supplied to the voltage converters to a respective output voltage by switching the switching element at a predetermined switching frequency. The power supply system further comprises a controller according to one of the embodiments set out above, for controlling a distribution of switching phases among the switching elements.

A further embodiment provides, in a power supply system comprising a plurality, N, of voltage converters, wherein each voltage converter comprises a respective one of the switching elements and is arranged to convert an input voltage supplied to the voltage converters to a respective output voltage by applying a control pulse to the respective switching element at a predetermined switching frequency, f, so as to switch the switching element ON for the duration of the control pulse during a switching period 1/f, and wherein the sum of the pulse durations of the control pulses used by the plurality of voltage converters in the switching period is smaller than the switching period, a method of determining a distribution of switching phases among the switching elements. The method comprises receiving one or more signals indicative of a respective contribution from each of the voltage converters to a ripple current component of an input current of the voltage converters. Based on the received one or more signals, a respective switching phase offset that is to be applied for the switching element in each of the voltage converters is calculated by: (i) determining a switching order in which the switching elements of the respective voltage converters are to be switched ON during a switching period, by assigning to each $j^{th}$ position in the switching order, where j=1, 2, ... N, a respective one of the voltage converters using the expression $$f(j) = \left(\frac{j+1}{2}\right)\left(\frac{1+(-1)^{j+1}}{2}\right) + \left(N - \frac{j-2}{2}\right)\left(\frac{1+(-1)^j}{2}\right),$$

where $f(j)$ represents the position, in a ranking of the voltage converters in order of decreasing contribution to the ripple current component, of the voltage converter for position j in the switching order; and (ii) arranging the control pulses of the voltage converters within the switching period in accordance with the determined switching order such that the period of time between each adjacent pair of control pulses in the switching period is the same. One or more output signals defining the calculated switching phase offsets to be applied to the switching of the respective switching elements are generated.

A further embodiment provides, in a power supply system comprising a plurality, N, of voltage converters, wherein each voltage converter comprises a respective one of the switching elements and is arranged to convert an input voltage supplied to the voltage converters to a respective output voltage by applying a control pulse to the respective switching element at a predetermined switching frequency, f, so as to switch the switching element ON for the duration of the control pulse during a switching period 1/f, and wherein the sum of the pulse durations of the control pulses used by the plurality of voltage converters in the switching period is smaller than the switching period, a method of determining a distribution of switching phases among the switching elements. The method comprises receiving one or more signals indicative of a respective contribution from each of the voltage converters to a ripple voltage component of an input voltage input to the voltage converters. Based on the received one or more signals, a respective switching phase offset that is to be applied for the switching element in each of the voltage converters is calculated by: (i) determining a switching order in which the switching elements of the respective voltage converters are to be switched ON during a switching period, by assigning to each $j^{th}$ position in the switching order, where j=1, 2, ... N, a respective one of the voltage converters using the expression $$f(j) = \left(\frac{j+1}{2}\right)\left(\frac{1+(-1)^{j+1}}{2}\right) + \left(N - \frac{j-2}{2}\right)\left(\frac{1+(-1)^j}{2}\right),$$

where $f(j)$ represents the position, in a ranking of the voltage converters in order of decreasing contribution to the ripple voltage component, of the voltage converter for position j in the switching order; and (ii) arranging the control pulses of the voltage converters within the switching period in accordance with the determined switching order such that the period of time between each adjacent pair of control pulses in the switching period is the same. One or more output signals defining the calculated switching phase offsets to be applied to the switching of the respective switching elements are generated.

Further embodiments described herein provide a computer program product, comprising a non-transient computer-readable storage medium or a signal, carrying computer program instructions which, when executed by a processor, cause the processor to perform a method as set out in one of the embodiments set out above.

BRIEF DESCRIPTION OF THE DRAWINGS

Embodiments of the invention will now be described, by way of example only, with reference to the accompanying drawings in which.

DETAILED DESCRIPTION OF EMBODIMENTS

First Embodiment

Figure 2:
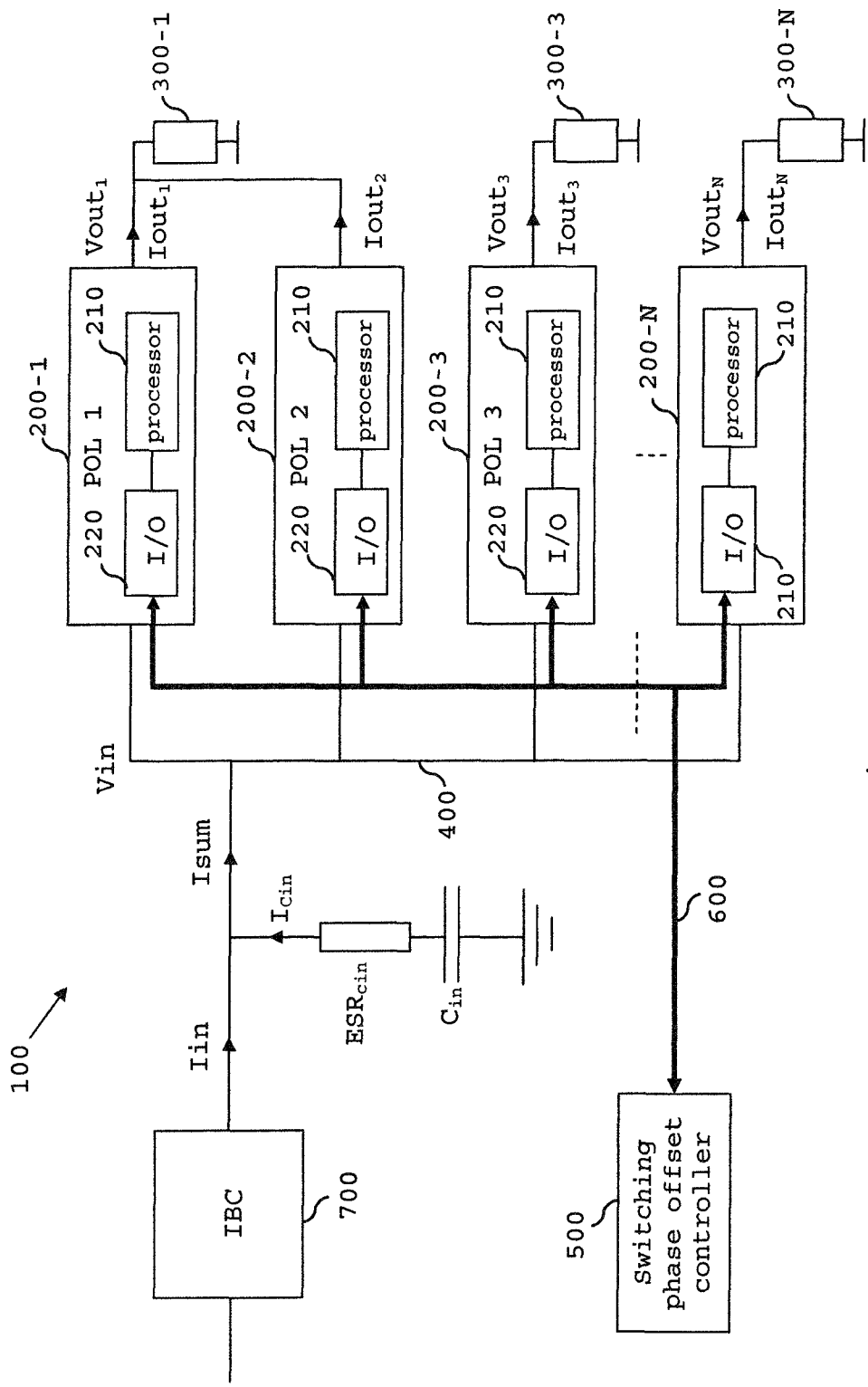
FIG. 2 illustrates a power supply system according to an embodiment of the present invention.

FIG. 2 is a schematic of a power supply system having a plurality of voltage converters in accordance with a first embodiment of the present invention, which takes the form of an IBA power system.

Figure 1:
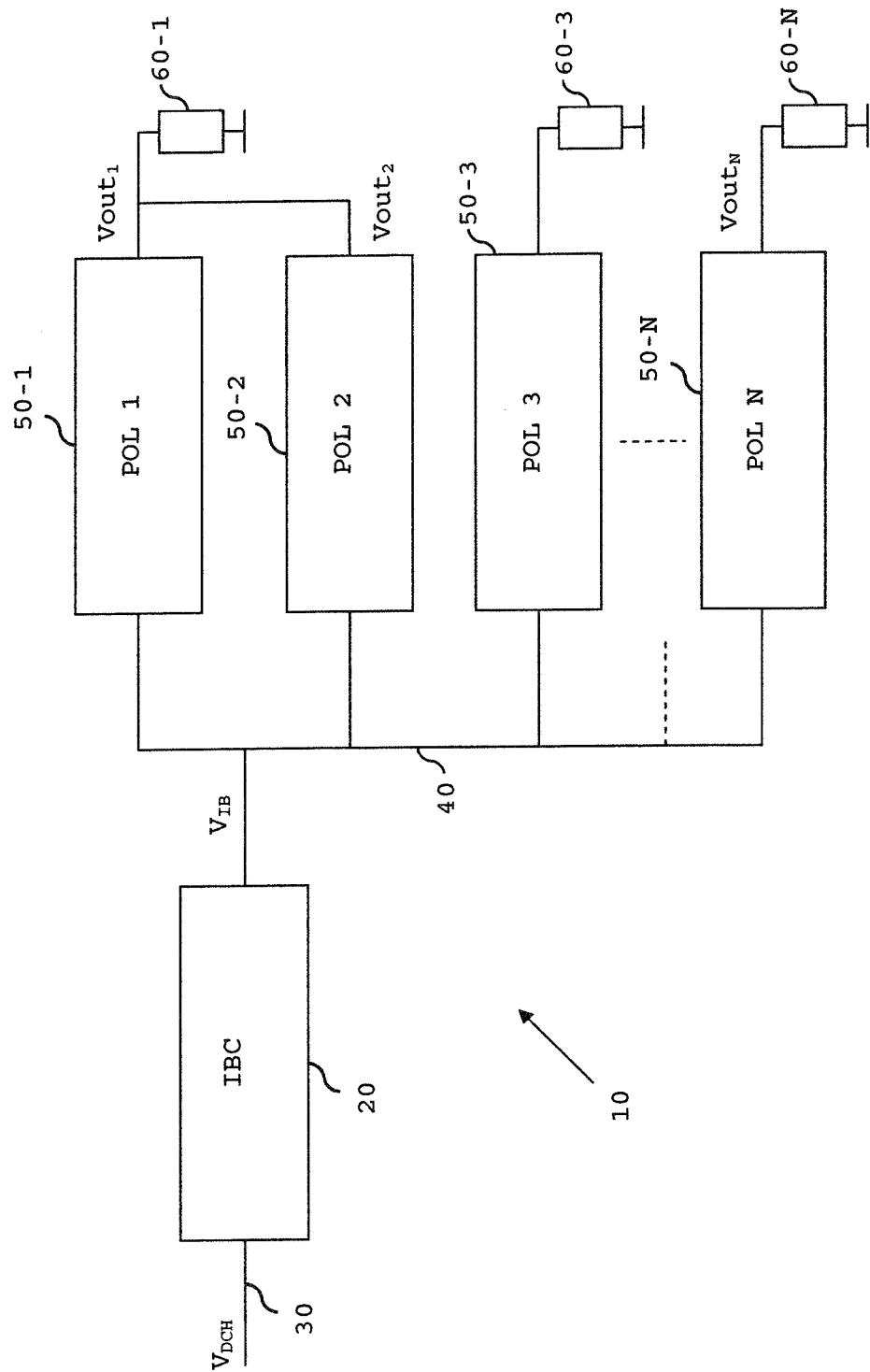
FIG. 1 illustrates an IBA power system as an example of a conventional power supply system having multiple switching voltage converters.

The IBA power system 100 shown in FIG. 2 comprises a plurality of voltage converters 200-1 to 200-N, each of which is a buck-topology regulator in the form of an SMPS, as in the example of FIG. 1. Thus, each of the voltage converters 200-1 to 200-N delivers a regulated output voltage $Vout_k$ to its load 300-k by switching a switching element (such as a power transistor, e.g. a power MOSFET) in the voltage converter. However, it should be noted that output voltage regulation is not an essential feature of the voltage converters 200-1 to 200-N so that, in general, only some of voltage converters 200-1 to 200-N, or none of voltage converters 200-1 to 200-N, may provide a regulated output voltage.

The switching of the switching element in a voltage converter 200-k occurs in accordance with a drive signal comprising a series of control pulses that are generated by the voltage converter 200-k and applied to the switching element at the switching frequency f. Each control pulse causes the switching element to switch ON for the duration of the control pulse, $dp_k$ (expressed in terms of a number of discrete time slots used by the controller 500 to perform its calculations) that is applied to the switching element of voltage converter 200-k. Thus, the switching duty cycle $D_k$ of voltage converter 200-k is given by $dp_k/T_s$ (where $T_s$ is, in this case, similarly expressed in terms of a number of the discrete time slots). The duty cycle $D_k$ determines the voltage conversion ratio according to which the voltage converter 200-$k$ converts the input voltage Vin supplied thereto via the intermediate voltage bus (IVB) 400 into the respective output voltage Vout$_k$. In the present embodiment, voltage converters 200-1 and 200-2 deliver power to a common load 300-1 (although, more generally, one, two or more than two voltage converters may deliver power to a load).

Although the value of the switching duty cycle may vary from converter to converter, the switching elements in the converters 200-1 to 200-N all switch at the same switching frequency, $1/T_s$, which is defined by a switch timing signal generated by a clock that may, in general, be located within one of the voltage converters 200-1 to 200-N, within another component of the power supply system 100 (e.g. the controller 500 or IBC 700 described herein below), or externally of the power supply system 100.

Each of the voltage converters 200-1 to 200-N is provided with a signal processor 210, and an input/output (I/O) interface 220 by which it can be digitally controlled and managed by a switching phase offset controller 500 via a control signal bus 600. In the present embodiment, control signals including the aforementioned switch timing signal are communicated from the switching phase offset controller 500 to the voltage converters 200-1 to 200-N using the PMBus protocol.

The switching phase offset controller 500 may be provided as a stand-alone hardware component, as illustrated in FIG. 2, or may be integrated as part of an on-board controller (not shown), the IBC 700 or one of the voltage converters 200-1 to 200-N, or as part of an off-board controller. The switching phase offset controller 500 controls the switching phase offsets of the converters 200-1 to 200-N so as to achieve a near-optimal distribution of the phase offsets that substantially minimises the current ripple in the IVB 400 and radiated emissions from the voltage converters 200-1 to 200-N. The operation of the switching phase offset controller 500 will be described in detail below.

Power may be supplied to the voltage converters 200-1 to 200-N from any suitable source. In the present embodiment, power is fed to the voltage converters 200-1 to 200-N via a first stage DC/DC converter 700 and the IVB 400. The first stage DC/DC converter 700 may be an isolated DC/DC converter. An IBA power supply having such a first stage DC/DC converter or IBC has the advantage of being more efficient and more cost-effective to manufacture because isolation from a power source upstream of the IBC, which generally requires the use of relatively costly components including a transformer, is provided at a single converter. Alternatively, the IBC 700 may not provide electrical isolation. The IBC 700 is preferably implemented in the efficient form of an SMPS, which can be fully regulated or line regulated to convert a source voltage input thereto to a lower voltage Vin, as shown in FIG. 2.

As also shown in FIG. 2, a low-pass filter is connected at the common input of the bank of voltage converters 200-1 to 200-N, which includes a capacitor having a capacitance $C_{in}$ and an equivalent series resistance (ESR) of $ESR_{Cin}$.

Figure 3:
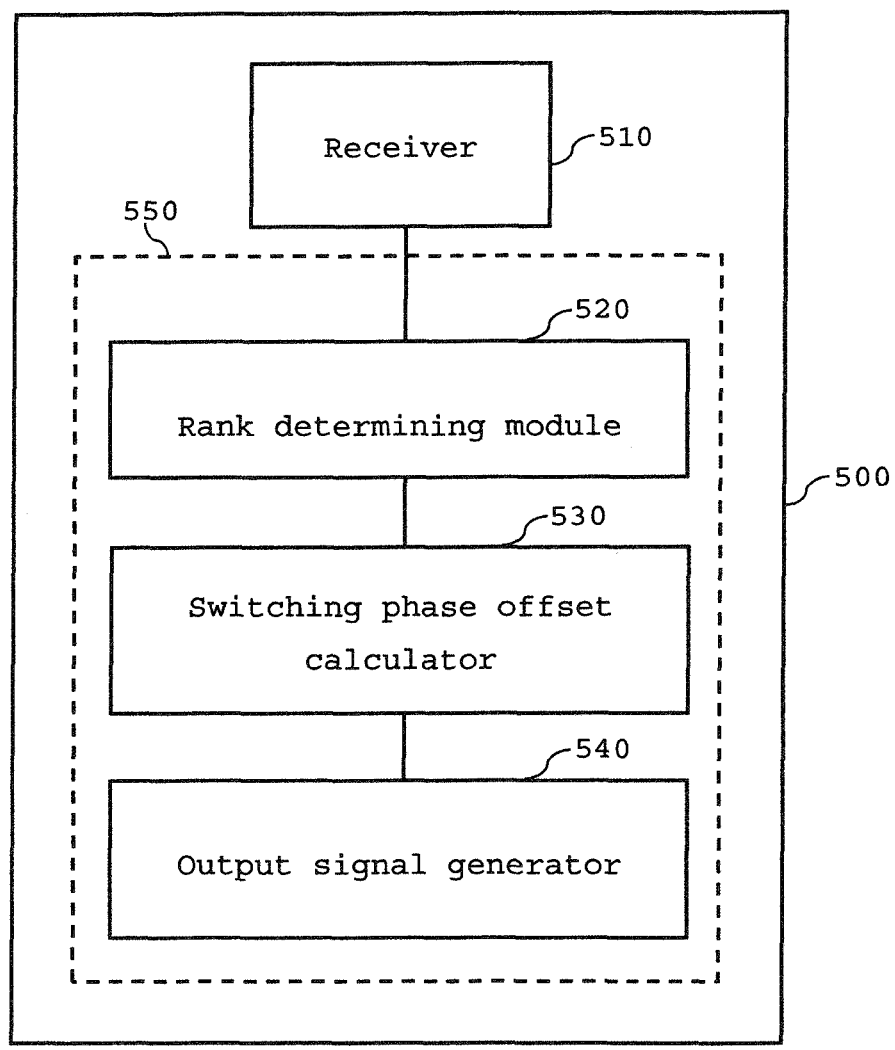
FIG. 3 illustrates functional components of the switching phase offset controller shown in FIG. 2.

FIG. 3 shows key function components of the switching phase offset controller 500. The controller 500 comprises a receiver 510, a rank determining module 520, a switching phase offset calculator 530, and an output signal generator 540, which are functionally inter-connected as shown. The rank determining module 520 is an optional component that may be omitted from the controller 500 in other embodiments, as will be explained in the following. The functionality of these components of the switching phase offset controller 500 will be described in detail below.

Figure 4:
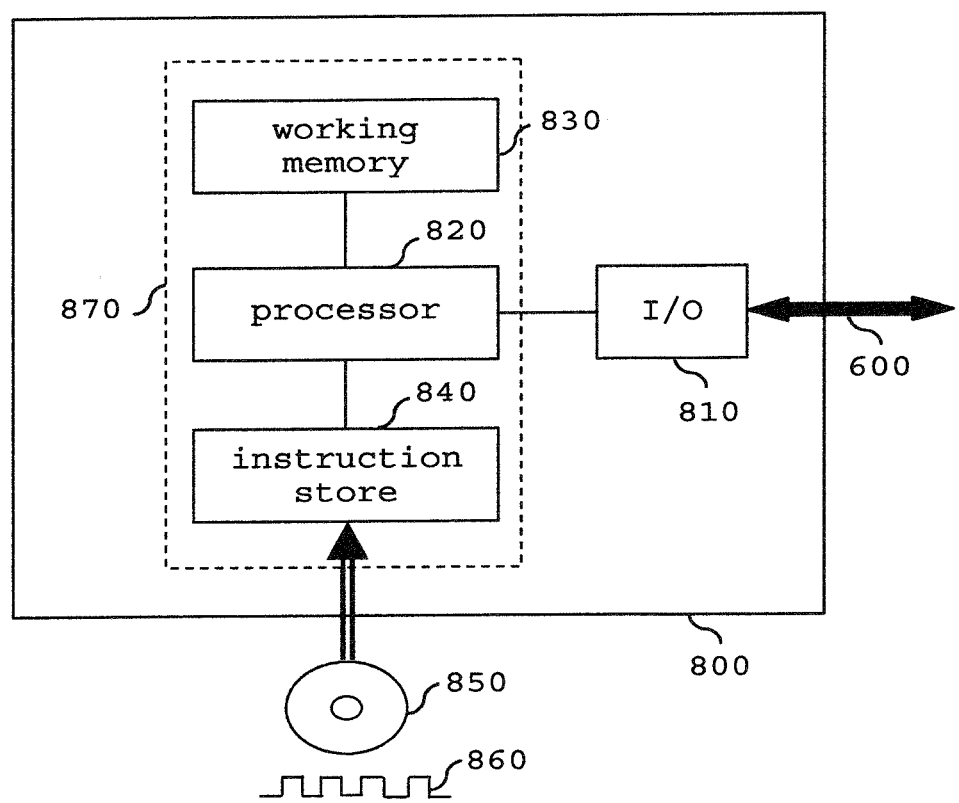
FIG. 4 shows an exemplary hardware implementation of the switching phase offset controller shown in FIG. 2.

FIG. 4 shows an exemplary implementation of the switching phase offset controller 500, in programmable signal processing hardware. The signal processing apparatus 800 shown in FIG. 4 comprises an input/output (I/O) or receiving section 810 for receiving signals hereinafter described from the voltage converters 200-1 to 200-N. The receiver 810 is connected to the I/O interfaces 220 of the voltage converters 200-1 to 200-N via the control signal bus 600, which enables an exchange of information and control signals therebetween. In particular, the receiver 810 is configured to receive information concerning the voltage converters' operating conditions, including their respective output currents Iout$_k$, and either their respective measured output voltages Vout$_k$ or duty cycles $D_k$.

As shown in FIG. 4, the signal processing apparatus 800 further comprises a processor 820, a working memory 830 and an instruction store 840 storing computer-readable instructions which, when executed by the processor 820 cause the processor 820 to perform the processing operations hereinafter described to calculate a respective switching phase offset that is to be applied for the switching element in each of the voltage converters 200-1 to 200-N, and generate output signal(s) defining the calculated switching phase offsets to be applied to the switching of the respective switching elements. The instruction store 840 may comprise a ROM which is pre-loaded with the computer-readable instructions. Alternatively, the instruction store 840 may comprise a RAM or similar type of memory, and the computer readable instructions can be input thereto from a computer program product, such as a computer-readable storage medium 850 such as a CD-ROM, etc. or a computer-readable signal 860 carrying the computer-readable instructions.

In the present embodiment, the combination 870 of the hardware components shown in FIG. 4, comprising the processor 820, the working memory 830 and the instruction store 840, is configured to implement the functionality of the aforementioned rank determining module 520, switching phase offset calculator 530 and output signal generator 540, which will now be described in detail with reference to FIG. 5.

Figure 5:
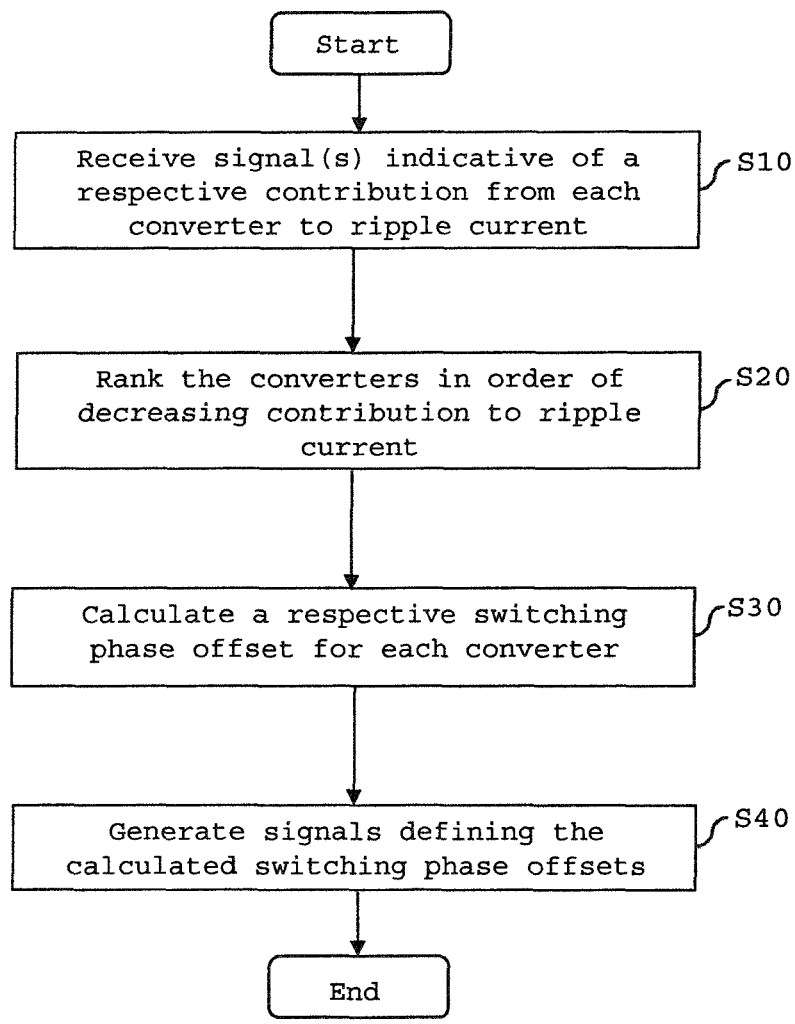
FIG. 5 is a flow diagram illustrating a method of controlling the distribution of switching phase offsets in the power supply system of FIG. 2.

FIG. 5 is a flow chart illustrating a process by which the controller 500 controls the distribution of switching phase offsets in the power supply system 100. It should be noted that the scheme of calculating the switching phase offsets described below relies on the sum of the pulse durations of the control pulses used by the plurality of voltage converters (200-1 to 200-N) in the switching period $T_s$ being smaller than the switching period $T_s$, i.e. $\Sigma dp_k < T_s$, where the sum is for k=1 to N.

In step S10, the receiver 510 receives one or more signals indicative of a respective contribution from each of the voltage converters 200-1 to 200-N to a ripple current Iripple that forms part of the overall input current Isum drawn from the IVB 400 by the voltage converters 200-1 to 200-N. In the present embodiment, the receiver 510 receives signals that are indicative of a respective output current Iout$_k$ and output voltage Vout$_k$ of each voltage converter 200-$k$. More specifically, the received signals convey measured values of the output current Iout$_k$ and output voltage Vout$_k$ of each voltage converter 200-$k$, which are measured during operation of the power supply system 100, when each voltage converter supplies power to a load 300-$k$. During such operation, the measured values of the output voltage (or current) are indicative of the contributions made by the respective voltage converters to the input current ripple. It should be noted, however, that the received signals may indicate, instead of the converter's measured output voltage $Vout_k$, the respective switching duty cycle $D_k$ used by each voltage converter 200-$k$ when it operates to supply power to its load 300-$k$. The switching duty cycle $D_k$ of the switching element in voltage converter 200-$k$ is related to its output voltage, $Vout_k$, by a well-defined relation. For example, the output voltage $Vout_k$ may be related to $D_k$ by the expression $Vout_k=\eta_k D_k Vin$, where $\eta_k$ is the efficiency of voltage converter 200-$k$.

Furthermore, as will be explained in the following, the received signals may alternatively convey estimated (rather than measured) values of the respective output current $Iout_k$ and output voltage $Vout_k$ (or duty cycle $D_k$) of each voltage converter 200-$k$, which are predicted to occur during operation of the power supply system 100. In such an alternative embodiment, the expected values of these parameters may be transmitted to the controller 500 by a user via a user interface (e.g. a guided user interface (GUI) on a display such as an LCD monitor) during configuration of the power supply system.

In step S20 of FIG. 5, the rank determining module 520 ranks the voltage converters 200-1 to 200-N in order of decreasing contribution to the ripple current Iripple, on the basis of the signals received at step S10. Thus, in step S20, the rank determining module 520 can be considered to order the voltage converters 200-1 to 200-N in a list, in accordance with the size of their respective contributions to the ripple current Iripple, so that the voltage converter providing (or expected to provide) the greatest contribution to the ripple current Iripple is placed at the top of the list and the voltage converter providing (or expected to provide) the smallest contribution appears at the bottom of the list.

The contribution that each of the voltage converters 200-1 to 200-N makes to the ripple current Iripple during operation of the power supply system 100 may be estimated in one of a number of ways. In the present embodiment, the received value of the measured output current $Iout_k$ of voltage converter 200-$k$ is taken to provide an indication of the contribution made by voltage converter 200-$k$ to the ripple current Iripple; the greater the value of $Iout_k$, the greater this contribution is assumed to be. The rank determining module 520 therefore ranks the voltage converters 200-1 to 200-N in order of decreasing values of the output current.

In step S20, the situation may arise where two or more of the voltage converters 200-1 to 200-N have (or, in the above-mentioned alternative embodiment, are predicted to provide) the same output current (i.e. within the accuracy with which the output current can be measured or predicted). In this case, to enable the ranking of these voltage converters (i.e. to decide the order in which these converters should appear in the list), the rank determining module 520 further ranks these two or more voltage converters in order of decreasing values of the output voltage $Vout_k$ (or $D_k$, as the case may be).

It should be noted that the rank determining module 520 may alternatively rank the voltage converters 200-1 to 200-N in order of decreasing values of the output voltage $Vout_k$ when the voltage converters are arranged to supply power to a respective load (or, as the case may be, the respective duty cycle, $D_k$, of the switching element in each voltage converter when each voltage converter is arranged to supply power to a respective load) and, where two or more of the voltage converters 200-1 to 200-N have (or, in the above-mentioned alternative embodiment, are predicted to provide) the same value of the output voltage $Vout_k$ (or $D_k$, as the case may be), then the rank determining module 520 further ranks these two or more voltage converters in order of decreasing values of the output current.

Then, once the voltage converters 200-1 to 200-N have been ranked, the switching phase calculator 530 calculates in step S30 a respective switching phase offset that is to be applied for the switching element in each of the voltage converters 200-1 to 200-N, as will now be explained.

In step S30, the switching phase offset calculator 530 determines a switching order in which the switching elements of the respective voltage converters 200-1 to 200-N are to be switched ON in each switching period $T_s$, by assigning to each $j^{th}$ position in the switching order, where $j=1, 2, \ldots N$, a respective one of the voltage converters using the expression:

$$f(j) = \left(\frac{j+1}{2}\right)\left(\frac{1+(-1)^{j+1}}{2}\right) + \left(N - \frac{j-2}{2}\right)\left(\frac{1+(-1)^{j}}{2}\right) \quad \text{Eqn. 1}$$

In Eqn. 1, $f(j)$ represents the position, in a ranking of the voltage converters 200-1 to 200-N in order of decreasing contribution to the ripple current Iripple, of the voltage converter for position $j$ in the switching order. In other words, the switching phase offset calculator 530 calculates, based on the signal received in step S10, a respective switching phase offset that is to be applied for the switching element in each of the voltage converters such that, for a ranking, $VC_1$, $VC_2$, ... $VC_N$, of the N voltage converters in order of decreasing contribution to ripple current Iripple, the order in which the voltage converters switch ON their respective switching elements in the switching period is given by $VC_{f(1)}$, $VC_{f(2)}$, ... $VC_{f(N)}$, with the $j^{th}$ element in this order being given by $VC_{f(j)}$, where $f(j)$ is given by Eqn. 1 above. In this way, the voltage converters switch ON their respective switching elements in the following order:

$VC_1$, $VC_N$, $VC_2$, $VC_{N-1}$, $VC_3$, $VC_{N-2}$, ...

so that the switching element of the highest-ranked voltage converter, $VC_1$, which provides (or is expected to provide) the largest contribution to the Iripple, is switched on first in the switching period, followed by the switching element of the lowest-ranked voltage converter $VC_N$, followed by the switching element of the next highest-ranked voltage converter $VC_2$, and so on.

The switching phase offset calculator 530 then arranges the control pulses of the voltage converters 200-1 to 200-N within the switching period $T_s$ in accordance with the determined switching order, with the period of time between each adjacent pair of control pulses in the switching period is the same.

For example, with the starting position of a control pulse of voltage converter 200-$k$ within a switching period being denoted as $S_k$, equal spacing between the control pulses of the voltage converters 200-1 to 200-$k$ in the switching period may be calculated using the following expression for $S_k$:

$$S_k = S_{k-1} + \text{ceiling}(dp_{k-1}) + \text{trunc}\left(\frac{P - S_{k-1} - \sum_{i=k-1}^{N} \text{ceil}(dp_i)}{N - (k-1)}\right) \quad \text{Eqn. 2}$$

In Eqn. 2, P denotes the number of the aforementioned time slots in each switching period $T_s$, ceiling(x) is the ceiling function, which rounds variable x upwards to the nearest integer, while trunk(x) truncates variable x to the nearest integer.

Figure 6:
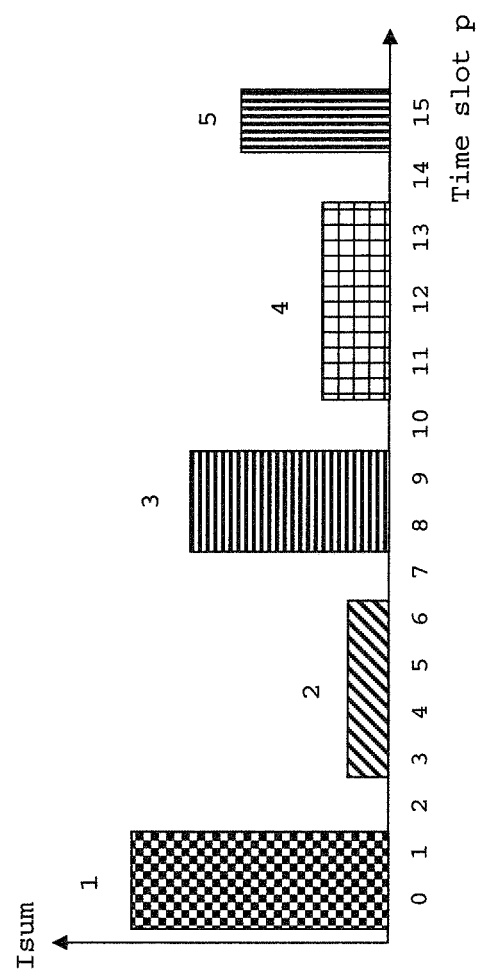
FIG. 6 illustrates a distribution of switch control pulses within a switching period that has been calculated by a method according to an embodiment.

FIG. 6 illustrates an example of a set of switch control pulses which have been arranged in this manner, and which may be used to effectively suppress the input current ripple in a power supply system having five parallel voltage converters. The output currents of the five voltage converters, as well as value of ceiling($dp_k$) for each respective voltage converter 200-$k$, for this example are shown in Table 1 below. It should be noted that the voltage converters in Table 1 have been arranged in accordance with the switching order as described above, with n representing the position of a voltage converter in the switching order.

TABLE 1

| n | Iout (A) | Ceiling ($dp_n$) |
|---|----------|------------------|
| 1 | 40 | 2 |
| 2 | 9 | 4 |
| 3 | 35 | 2 |
| 4 | 10 | 3 |
| 5 | 20 | 1 |

With the beginning of the switching control pulse of the first voltage converter in the switching order being placed at the beginning of the switching period (such that $S_1=0$), and the number of time slots in the switching period P=16 in the present example, the positions of the of the remaining voltage converters may be calculated using Eqn. 2 as follows:

$$S_2 = 0 + 2 + trunc\left(\frac{16 - 0 - (2+4+2+3+1)}{5-1}\right) = 3$$

$$S_3 = 3 + 4 + trunc\left(\frac{16 - 3 - (4+2+3+1)}{5-2}\right) = 8$$

$$S_4 = 8 + 2 + trunc\left(\frac{16 - 8 - (2+3+1)}{5-3}\right) = 11$$

$$S_5 = 11 + 3 + trunc\left(\frac{16 - 11 - (3+1)}{5-4}\right) = 15$$

As shown in FIG. 6, the switch control pulses for the voltage converters are arranged within the switching period according to the switching order indicated in Table 1 (which, as explained above, is based on Eqn. 1), with the same spacing (in this example, one time slot wide) being provided between each adjacent pair of control pulses.

Referring again to FIG. 5, once the switching phase offsets for all of the converters 200-1 to 200N have been determined in the manner described above, the process proceeds to step S40, wherein the output signal generator 540 generates one or more output signals that define the calculated switching phase offsets to be applied for the switching of the respective switching elements. On the basis of these output signals, the controller 500 generates control signals defining the calculated switching phase offsets to cause the calculated switching phase offsets to be applied to the switching of the respective switching elements. These control signals are then transmitted to the voltage converters 200-1 to 200-N via the control signal bus 600, received by the voltage converters via their respective I/O interfaces 220, and processed by their respective processors 210 such that each voltage converter sets the phase offset of its switching to the respective calculated value.

Second Embodiment

In the above-described first embodiment, the switching phase offset calculator 530 is configured to calculate a respective switching phase offset that is to be applied for the switching element in each of the voltage converters 200-1 to 200-N based on one or more signals that are indicative of a respective contribution from each of the voltage converters to Iripple, specifically, by making use of a ranking of the voltage converters in order of decreasing contribution to Iripple. However, the ranking of the voltage converters may alternatively be determined on the basis of the converters' respective contributions to the input voltage ripple, Vripple, as will now be explained with reference to FIG. 7.

In step S10-2, the receiver 510 receives one or more signals indicative of a respective contribution from each of the voltage converters 200-1 to 200-N to Vripple. In the present embodiment, the receiver 510 receives signals that are indicative of a respective output current $Iout_k$ and output voltage $Vout_k$ of each voltage converter 200-$k$, as described above in relation to the first embodiment. As with the first embodiment, the received signals may indicate, instead of the converter's measured output voltage $Vout_k$, the respective switching duty cycle $D_k$ used by each voltage converter 200-$k$ when it operates to supply power to its load 300-$k$.

Furthermore, as is the case with the first embodiment, the received signals may alternatively convey estimated (rather than measured) values of the respective output current $Iout_k$ and output voltage $Vout_k$ (or duty cycle $D_k$) of each voltage converter 200-$k$, which are predicted to occur during operation of the power supply system 100. In such an alternative embodiment, the expected values of these parameters may be transmitted to the controller 500 by a user via a user interface (e.g. a guided user interface (GUI) on a display such as an LCD monitor) during configuration of the power supply system.

Figure 7:
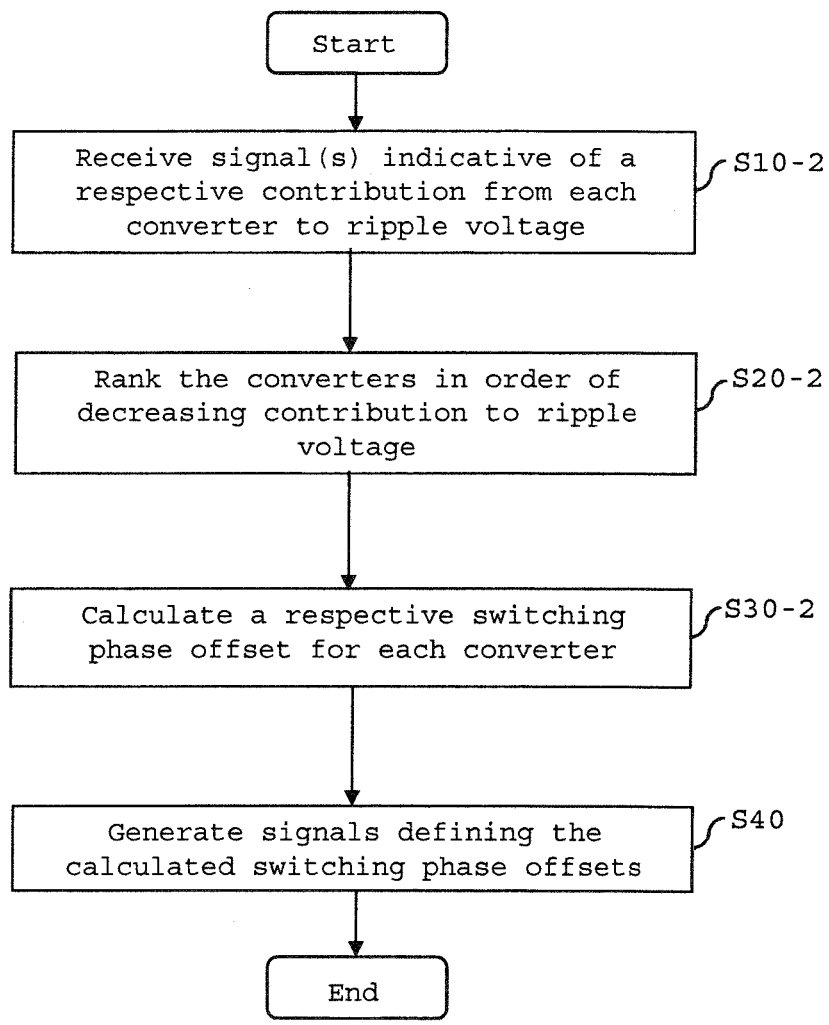
FIG. 7 is a flow diagram illustrating an alternative method of controlling the distribution of switching phase offsets in the power supply system of FIG. 2.

In step S20-2 of FIG. 7, the rank determining module 520 ranks the voltage converters 200-1 to 200-N in order of decreasing contribution to the ripple voltage, Vripple, on the basis of the signals received at step S10-2. Thus, in step S20-2, the rank determining module 520 can be considered to order the voltage converters 200-1 to 200-N in a list, in accordance with the size of their respective contributions to Vripple, so that the voltage converter providing (or expected to provide) the greatest contribution to the Vripple is placed at the top of the list and the voltage converter providing (or expected to provide) the smallest contribution appears at the bottom of the list.

The contribution that each of the voltage converters 200-1 to 200-N makes to Vripple during operation of the power supply system 100 may be estimated in one of a number of ways. In the present embodiment, the received value of the measured output current $Iout_k$ of voltage converter 200-$k$ is taken to provide an indication of the contribution made by voltage converter 200-$k$ to the ripple voltage; the greater the value of $Iout_k$, the greater this contribution is assumed to be. The rank determining module 520 therefore ranks the voltage converters 200-1 to 200-N in order of decreasing values of the output voltage.

In step S20-2, the situation may arise where two or more of the voltage converters 200-1 to 200-N have (or, in the above-mentioned alternative embodiment, are predicted to provide) the same output current (i.e. within the accuracy with which the output current can be measured or predicted). In this case, to enable the ranking of these voltage converters (i.e. to decide the order in which these converters should appear in the list), the rank determining module 520 further ranks these two or more voltage converters in order of decreasing values of the output voltage $Vout_k$ (or $D_k$, as the case may be).

It should be noted that the rank determining module 520 may alternatively rank the voltage converters 200-1 to 200-N in order of decreasing values of the output voltage $Vout_k$ when the voltage converters are arranged to supply power to a respective load (or, as the case may be, the respective duty cycle, $D_k$, of the switching element in each voltage converter when each voltage converter is arranged to supply power to a respective load) and, where two or more of the voltage converters 200-1 to 200-N have (or, in the above-mentioned alternative embodiment, are predicted to provide) the same value of the output voltage $Vout_k$ (or $D_k$, as the case may be), then the rank determining module 520 further ranks these two or more voltage converters in order of decreasing values of the output current.

Then, once the voltage converters 200-1 to 200-N have been ranked, the switching phase calculator 530 calculates in step S30-2 a respective switching phase offset that is to be applied for the switching element in each of the voltage converters 200-1 to 200-N. The processes performed in step S30-2 are the same as in step S30 of the first embodiment, except that, in the present embodiment, $f(j)$ represents the position, in a ranking of the voltage converters 200-1 to 200-N in order of decreasing contribution to the ripple voltage, Vripple, of the voltage converter for position j in the switching order. Thus, in the present embodiment, the voltage converters switch ON their respective switching elements in the following order:

$VC_1, VC_N, VC_2, VC_{N-1}, VC_3, VC_{N-2}, \ldots$ so that the switching element of the highest-ranked voltage converter, $VC_1$, which provides (or is expected to provide) the largest contribution to the Vripple, is switched on first in the switching period, followed by the switching element of the lowest-ranked voltage converter $VC_N$, followed by the switching element of the next highest-ranked voltage converter $VC_2$, and so on.

In other respects, the present embodiment is the same as the first embodiment above, and it will be appreciated that the modifications and variations thereof described above also apply to the present embodiment.

Modifications and Variations

Many modifications and variations can be made to the embodiments, without departing from the scope of the present invention.

For example, in the above-described embodiments and modifications thereof, the output current $Iout_k$, output voltage $Vout_k$ and/or the duty cycle $D_k$ of a converter are taken to provide an indication of the contribution from converter 200-k to the input current voltage ripple. However, the converters 200-1 to 200-N may be ranked on the basis of other indictors of this contribution. For example, in a yet further embodiment, the receiver 510 may be configured to receive, as the one or more signals indicative of the contribution from each of the voltage converters 200-1 to 200-N to the ripple current Tripple, one or more signals that are indicative of a product of a respective output current $Iout_k$, and one of: (i) the respective output voltage $Vout_k$; and (ii) a respective switching duty cycle $D_k$, of each voltage converter 200-k when each voltage converter is arranged to supply power to a respective load. In this variant, the rank determining module 520 is configured to rank the voltage converters 200-1 to 200-N in order of decreasing values of said product, i.e. $Iout_k \cdot Vout_k$ or $Iout_k \cdot D_k$, as the case may be. The second embodiment described above may be modified in the same way.

Furthermore, in an alternative briefly mentioned in the description of the first embodiment above, the signals received by the receiver 510 at step S10 may convey estimated (rather than measured) values of the respective output current $Iout_k$ and output voltage $Vout_k$ (or duty cycle $D_k$) of each voltage converter 200-k, which are predicted to occur during operation of the power supply system 100. In this alternative embodiment, the expected values of these parameters may be transmitted to the controller 500 by a user via a user interface (e.g. a guided user interface (GUI) on a display such as an LCD monitor) during configuration of the power supply system 100, for example at the factory or on-site during installation. The rank determining module 520 and the switching phase offset calculator 530 of this embodiment then perform the operations described above to calculate the respective phase offset values, and the output signal generator 540 generates signals defining the calculated phase offset values, for output to the user interface. In this way, the user of the power supply system 100 may view the calculated phase offset values on a display, and set the converters 200-1 to 200-N to operate in accordance with the respective phase offset values; this could be done by e.g. issuing appropriate commands to the controller 500 via the user interface, or by directly configuring each converter in turn, using the INTERLEAVE command offered in PMBus Specification v1.2, for example.

The power supply system described above takes the exemplary form of an IBA power system, although it will be appreciated that the switching phase offset control techniques described herein are applicable to other types of power supply system having multiple switching voltage converters that switch at a common switching frequency to convert an input voltage into respective output voltages. For example, although each of the voltage converters in the above-described embodiments is stand-alone buck converter in the form of an SMPS, it will be appreciated that, in alternative embodiments, the power supply system may have, instead of or in addition to such stand-alone converters, one or more SMPSs each comprising multiple voltage converters of the aforementioned most general form (as in the case of a multiphase buck converter, for example).

In the above-described embodiments, the switching phase offset calculator 530 calculates a respective switching phase offset that is to be applied for the switching element in each of the voltage converters 200-1 to 200-N by making use of the ranking of the voltage converters which has been determined by the ranking module 520. However, the switching phase offset calculator 530 may alternatively calculate the switching phase offsets without making use of a pre-calculated ranking of the voltage converters. In a modification of the first embodiment, where a rank determining module 520 is not provided, the switching phase offset calculator 530 may determine the switching order, for example, by:

(i) selecting, as the voltage converter whose switching element is to be switched ON first in the switching period, the voltage converter that is to provide the largest contribution to the ripple current component;

(ii) selecting, as the voltage converter whose switching element is to be switched ON second in the switching period, the voltage converter that is to provide the smallest contribution to the ripple current component;

(iii) selecting, as the voltage converter whose switching element is to be switched ON next in the switching period, the voltage converter of the remaining voltage converters that is to provide the largest contribution to the ripple current component;

(iv) selecting, as the voltage converter whose switching element is to be switched ON next in the switching period, the voltage converter of the remaining voltage converters that is to provide the smallest contribution to the ripple current component;
(v) repeating steps (iii) and (iv) until each of the voltage converters in the power supply system 100 has been selected.

It will be appreciated that the second embodiment described above may be modified in the same way.

The foregoing description of embodiments of the present invention has been presented for the purpose of illustration and description. It is not intended to be exhaustive or to limit the invention to the present form disclosed. Alternations, modifications and variations can be made without departing from the spirit and scope of the present invention.

The invention claimed is:

1. A controller configured to control switching elements of a plurality of voltage converters of a power system, each switching element being switched on for a corresponding duration of time and a sum of said corresponding duration of times being less than a switching period of said plurality of voltage converters, said controller, comprising:
a processor; and
a memory including computer program code, wherein said processor, said memory, and said computer program code are collectively operable to:
receive a signal representing an operating condition that indicates a contribution of each of said plurality of voltage converters to a ripple component of an input current or an input voltage of said power system;
rank said plurality of voltage converters based on said contribution of each of said plurality of voltage converters to said ripple component; and
calculate a switching phase offset for each switching element of said plurality of voltage converters by:
determining a switching order for each switching element of said plurality of voltage converters based on an alternating extremum contribution to said ripple component for each of said plurality of voltage converters, and
arranging control signals for each switching element of said plurality of voltage converters based on said switching order.

2. The controller as recited in claim 1 wherein said memory and said computer program code are further configured to, with said processor cause said controller to determine said switching order according to a function:

$$f(j) = \left(\frac{j+1}{2}\right)\left(\frac{1+(-1)^{j+1}}{2}\right) + \left(N - \frac{j-2}{2}\right)\left(\frac{1+(-1)^{j}}{2}\right),$$

wherein an integer j represents a position in said switching order of said plurality of voltage converters, N represents a count of said plurality of voltage converters, and said function $f(j)$ represents a position of one of said plurality of voltage converters for said position j.

3. The controller as recited in claim 1 wherein said memory and said computer program code are further configured to, with said processor cause said controller to generate control signals to be applied to and based on said switching phase offset for each switching element of said plurality of voltage converters.

4. The controller as recited in claim 3 wherein a time duration between said control signals turning on each switching element of said plurality of voltage converters is substantially equal.

5. The controller as recited in claim 1 wherein said memory and said computer program code are further configured to, with said processor cause said controller to rank said plurality of voltage converters based on a decreasing contribution of each of said plurality of voltage converters to said ripple component.

6. The controller as recited in claim 1 wherein a first voltage converter of said plurality of voltage converters in said switching order provides a highest contribution to said ripple component and a second voltage converter of said plurality of voltage converters in said switching order provides a lowest contribution to said ripple component.

7. The controller as recited in claim 1 wherein said memory and said computer program code are further configured to, with said processor cause said controller to rank said plurality of voltage converters in order of decreasing values of said operating condition thereof.

8. The controller as recited in claim 1 wherein at least two of said plurality of voltage converters provide equal contributions to said ripple component, and said memory and said computer program code are further configured to, with said processor cause said controller to rank said at least two of said plurality of voltage converters in order of decreasing values of said operating condition thereof.

9. The controller as recited in claim 1 wherein said memory and said computer program code are further configured to, with said processor cause said controller to estimate said operating condition for each of said plurality of voltage converters.

10. The controller as recited in claim 1 wherein said operating condition is an output current, an output voltage or a duty cycle associated with each of said plurality of voltage converters.

11. A method configured to control switching elements of a plurality of voltage converters of a power system, each switching element being switched on for a corresponding duration of time and a sum of said corresponding duration of times being less than a switching period of said plurality of voltage converters, said method, comprising:
receiving a signal representing an operating condition that indicates a contribution of each of said plurality of voltage converters to a ripple component of an input current or an input voltage of said power system;
ranking said plurality of voltage converters based on said contribution of each of said plurality of voltage converters to said ripple component; and
calculating a switching phase offset for each switching element of said plurality of voltage converters by:
determining a switching order for each switching element of said plurality of voltage converters based on an alternating extremum contribution to said ripple component for each of said plurality of voltage converters, and
arranging control signals for each switching element of said plurality of voltage converters based on said switching order.

12. The method as recited in claim 11 wherein said determining said switching order is according to a function:

$$f(j) = \left(\frac{j+1}{2}\right)\left(\frac{1+(-1)^{j+1}}{2}\right) + \left(N - \frac{j-2}{2}\right)\left(\frac{1+(-1)^{j}}{2}\right),$$

wherein an integer j represents a position in said switching order of said plurality of voltage converters, N represents a count of said plurality of voltage converters, and said function ƒ(j) represents a position of one of said plurality of voltage converters for said position j.

13. The method as recited in claim 11 further comprising generating control signals to be applied to and based on said switching phase offset for each switching element of said plurality of voltage converters.

14. The method as recited in claim 13 wherein a time duration between said control signals turning on each switching element of said plurality of voltage converters is substantially equal.

15. The method as recited in claim 11 wherein said ranking said plurality of voltage converters is based on a decreasing contribution of each of said plurality of voltage converters to said ripple component.

16. The method as recited in claim 11 wherein a first voltage converter of said plurality of voltage converters in said switching order provides a highest contribution to said ripple component and a second voltage converter of said plurality of voltage converters in said switching order provides a lowest contribution to said ripple component.

17. The method as recited in claim 11 wherein said ranking said plurality of voltage converters is in order of decreasing values of said operating condition thereof.

18. The method as recited in claim 11 wherein at least two of said plurality of voltage converters provide equal contributions to said ripple component, and said method further comprises ranking said at least two of said plurality of voltage converters in order of decreasing values of said operating condition thereof.

19. The method as recited in claim 11 further comprising estimating said operating condition for each of said plurality of voltage converters.

20. The method as recited in claim 11 wherein said operating condition is an output current, an output voltage or a duty cycle associated with each of said plurality of voltage converters.

* * * * *